Patented Dec. 22, 1931

1,838,034

UNITED STATES PATENT OFFICE

SIDNEY M. CADWELL, OF LEONIA, AND SHERMAN I. STRICKHOUSER, OF PASSAIC, NEW JERSEY, ASSIGNORS TO THE NAUGATUCK CHEMICAL COMPANY, OF NAUGATUCK, CONNECTICUT, A CORPORATION OF CONNECTICUT

TREATMENT OF RUBBER

No Drawing. Application filed January 19, 1929, Serial No. 333,741. Renewed July 13, 1931.

This invention relates to the treatment of rubber and similar vulcanizable materials and particularly to a process of treating rubber whereby deterioration of the rubber is retarded. It also relates to the products obtained by such a process.

An object of this invention is to provide a class of chemicals which will retard the deterioration and surface cracking of rubber. Another object is to provide a class of chemicals which while retarding the deterioration of rubber both during vulcanization, and after vulcanization, as when in use, will also cause substantially no discoloration of the rubber, even when it is exposed to sunlight.

In the past the use of organic bases as retarders of the deterioration of rubber has been limited by practical considerations largely to the use of such bases as have substantially no accelerating effect upon the rate of vulcanization. Similarly the utility of naphthols as retarders of deterioration has been limited by the property possessed by this class of chemicals of retarding markedly the rate of vulcanization. Furthermore, naphthols, when used alone are believed to be of little or no value as anti-oxidants,—becoming active in this respect only when used in the presence of a base or in a basic medium.

This invention provides a means of neutralizing the accelerating effect of an organic base by suitable admixture of a naphthol, at the same time providing a base, possessing anti-oxidant properties, in the presence of which the naphthol also becomes an effective anti-oxidant. Thus there is used to the fullest advantage the property of retarding the deterioration of rubber, possessed mutually by the two classes of chemicals,—while the opposite effects on the rate of vulcanization produced by the two classes of chemicals are mutually nullified. Accordingly this invention is concerned with the treatment of rubber with the material obtained by mixing a polyalkylene polyamine or an aldehyde derivative thereof with a naphthol, particularly a monohydric naphthol. The mixing is carried out at temperatures preferably not substantially in excess of the melting point of the naphthol in such a manner as to preclude the elimination of water from the molecules of the constituent substances. It is believed that as a result of this mixing a molecular addition compound is formed. The rubber may be treated with the component compounds in any manner, e. g. with the material resulting from mixing the stated compounds, or with each of the component compounds separately, in any order, and at any known stage of mixing ingredients with rubber; for instance, one component may be added to the rubber and then the other component added whereby the same resultant material may be set up in the rubber instead of being preformed. As a result of any such treatment there is present in the rubber a constituent corresponding to the polyalkylene polyamine or aldehyde derivative thereof, which has the property of retarding the deterioration of rubber and of accelerating the rate of vulcanization,—and also a constituent corresponding to the naphthol which has the property of retarding the rate of vulcanization and which becomes by reason of the presence of the polyamine also a retarder of deterioration. Exemplary of the polyalkylene polyamines are polyethylene polyamine, diethylene triamine, methylated polyalkylene polyamines such as penta methyl diethylene triamine, triethyltrimethylene triamine,—and exemplary of the aldehyde derivatives, the formaldehyde, acetaldehyde, butyraldehyde, and heptaldehyde derivatives of the polyalkylene polyamines,—and exemplary of the naphthols, alpha and beta naphthol. Polyethylene polyamine is so designated because it is believed to contain a number of individual polyethylene polyamines including diethylene triamine. For this reason polyalkylene polyamine and polyethylene polyamine are to be construed as covering either a single polyalkylene polyamine or polyethylene polyamine, or a mixture of a number of them. The products resulting from mixing a polyalkylene polyamine and a naphthol are substantially soluble in an excess of hot aqueous 10% sodium hydroxide.

Polyethylene polyamine is prepared by heating one mole of ethylene dichloride with 2½ moles of ammonia in the form of aqueous ammonia and from .15 to .35 mole of sodium acetate in an autoclave. The autoclave is heated for two to three hours by means of steam maintained at a pressure of 160 pounds per square inch. When the heating has been finished the temperature is allowed to drop to about 60° C. and the excess of ammonia is blown off and may be recovered. The liquid reaction mixture is filtered to remove inorganic salts, chiefly ammonium chloride, which have been precipitated. Solid sodium hydroxide is added until the solution becomes saturated with sodium hydroxide. The mixture then separates into two layers, the upper layer comprising the polyethylene polyamine. This layer is drawn off and the portion boiling above 130° C. is used.

Illustrative of the invention is the following:

1.5 parts of a material made by melting together 15 grams polyethylene polyamine, (B. P. above 130° C.), 85 grams beta naphthol, and 2 grams stearic acid, are mixed on the mixing rolls in the usual manner with 100 parts of rubber, 10 parts zinc oxide, 3 parts sulphur, .3 part of the condensation product of heptaldehyde and aniline diluted with spindle oil. This mix (A) is vulcanized in a mold under 40 lbs. steam pressure for 30 minutes and for 60 minutes. Another mix (B) is made of 100 parts rubber, 10 parts zinc oxide, 3 parts sulphur and .3 parts of heptaldehyde-aniline condensate diluted with spindle oil and vulcanized under the same conditions. The tensiles obtained are given below:

|  | Mix B | Mix A (containing 1.5 parts of the antioxidant material) |
|---|---|---|
| Green—30' | 2635 | 3525 |
| 60' | 2915 | 3800 |
| 3 weeks at 158° F. |  |  |
| 30' | 1985 | 3105 |
| 60' | 1545 | 2845 |

The stock corresponding to A does not discolor in sunlight appreciably more than a blank stock not containing the antioxidant, whereas other antioxidants now on the market cause discoloration of rubber stocks when exposed to sunlight, and therefore cannot be used in light colored rubber goods. It has also been found that this antioxidant retards oxidation during air curing, better than any other known antioxidant. It has been additionally observed that the antioxidant retards and lessens surface cracking when the stock under no tension is exposed to sunlight. Stocks not containing the antioxidant develop cracks, while only slight surface checking and no actual cracks develop when the stock contains the antioxidant. In place of polyethylene polyamine one may use triethyltrimethylenetriamine and also obtain a vulcanized rubber that will show substantially no discoloration when exposed to sunlight. It is of course obvious that in place of the heptaldehyde-aniline accelerator any other suitable accelerator may be used, and in place of the specific amine and naphthol mentioned, any of the other corresponding materials may be used.

A typical white tile stock vulcanized in a mold for 20 minutes at 60 pounds steam pressure gave the following tensile:

|  | Stock with no antioxidant | Stock with 1.67 pts. of antioxidant |
|---|---|---|
| Green tensile | 1190 | 1070 |
| After 7 days in the oxygen bomb | Too poor to test | 870 |

In carrying out the invention, the age retarding material may be added to the rubber in various manners. For instance, if it is to be added to solid rubber in unvulcanized form, either uncompounded or compounded, it may be directly incorporated on the mixing mill, or it may be first compounded with some inert material such as stearic acid and added in this form to the rubber on the mixing mill, or it may be mixed with rubber latex (natural or artificial) or dissolved in a suitable solvent and then added on the mill. If it is to be applied to vulcanized rubber thin sheets of the latter may be dipped, brushed, or otherwise coated with the age retarder if in liquid form. The retarder may be dissolved in a suitable solvent and then applied to the rubber. When the retarder is to be added to the latex, either vulcanized or unvulcanized, if the retarder is water soluble it may be directly added or added in the form of a water solution. If the retarder is insoluble in water but soluble in organic or other solvents it may be dissolved in these and then emulsified and added to the latex, while if in the form of an insoluble solid it may be added in the form of a suspension. As little as 3 parts of the antioxidant such as that used in the example given, per 100 parts of latex solids, increased the life of a rubber fabric ten fold when exposed to strong sunlight.

Where the retarder is to be added to compounded latex containing fillers such as zinc oxide, to avoid coagulation it is preferably first dissolved in a suitable solvent such as butyl acetate or solvent naphtha, the solution being then emulsified and the emulsion added to the compounded latex. The above is merely illustrative of various ways by which various age retarders comprised in the invention may be added to various forms of rubber, whether it be in the form of cement, dough, or of latex. They are also applicable to synthetic rubbers, and to balata, gutta percha, and similar rubber-like materials. For instance, purified balata in thin sheets becomes hard and brittle and cracks in a very few days. The presence in the balata of a small amount of the antioxidant, such as that used in the example given, preserves a thin film of balata in such manner that after six months the balata is still so tough it cannot be broken or torn with the fingers. Moreover this preserved balata shows substantially no discoloration. The term "rubber" therefore when use in the specification and claims without qualification, is to be interpreted in a broad sense.

The chemicals disclosed may be used to retard the deterioration of inner tubes, tires, thread, hose, dipped goods, mechanical goods, etc. and those which do not discolor the rubber may be used in light colored tile, clothing, footwear, and other fabricated rubber articles as well.

In applying the invention it is clear that the relative amounts of the two chemicals which together make up the antioxidant can be varied at will, as can the other ingredients of the rubber mix, so that there is obtained both control of vulcanization and utilization of the antioxidant properties of the two chemicals,—all without departing from the principle of the invention.

While in the example given certain vulcanizing ingredients are disclosed, the invention is not limited to these and it may be carried out by the use of any other suitable material. Also with the detailed disclosure above given it is obvious that modifications will suggest themselves and it is not desired to limit the invention otherwise than as set forth in the appended claims.

Having thus described our invention, what we claim and desire to protect by Letters Patent is:

1. The process of retarding the deterioration of rubber which comprises treating rubber with the material obtained by mixing a polyalkylene polyamine and a naphthol at temperatures not substantially higher than the melting point of the naphthol.

2. The process of retarding the deterioration of rubber which comprises treating rubber with the material obtained by mixing an open chain polyalkylene polyamine and a naphthol at temperatures not substantially higher than the melting point of the naphthol.

3. The process of retarding the deterioration of rubber which comprises treating the rubber with the product obtained by mixing a polyalkylene polyamine and a naphthol, which product is substantially soluble in an excess of hot aqueous 10% sodium hydroxide.

4. The process of retarding the deterioration and surface cracking of rubber which comprises treating rubber with the material obtained by mixing a polyethylene polyamine having a boiling point above 130° C., and a monohydroxy naphthalene.

5. The process of retarding the deterioration and surface cracking of rubber which comprises treating rubber with the material obtained by mixing a polyethylene polyamine having a boiling point above 130° C., and beta naphthol.

6. The process of retarding the deterioration and surface cracking of rubber which comprises treating rubber with the material obtained by mixing a material comprising diethylenetriamine and beta naphthol.

7. The process of retarding the deterioration of rubber which comprises treating rubber in the form of a vulcanizable rubber stock with the material, obtained by mixing a polyalkylene polyamine and a naphthol, at temperatures not substantially greater than the melting point of the naphthol, and vulcanizing the stock.

8. The process of retarding the deterioration of rubber which comprises treating rubber in the form of a vulcanizable rubber stock with the material obtained by mixing a polyalkylene polyamine and a naphthol, which material is substantially soluble in an excess of hot aqueous 10% sodium hydroxide, and vulcanizing the stock.

9. The process of retarding the deterioration and surface cracking of rubber which comprises treating rubber in the form of a vulcanizable rubber stock with the material obtained by mixing a polyethylene polyamine having a boiling point above 130° C. and a monohydroxy naphthalene, and vulcanizing the stock.

10. The process of retarding the deterioration and surface cracking of rubber which comprises treating rubber in the form of a vulcanizable rubber stock with the material obtained by mixing a material comprising diethylene triamine and beta naphthol, and vulcanizing the stock.

11. The process of retarding the deterioration and surface cracking of rubber which comprises treating a vulcanizable combination containing rubber, a vulcanizing agent, and a vulcanization accelerator, with the material obtained by mixing a polyethylene polyamine having a boiling point above 130° C. and a monohydroxy naphthalene.

12. A product comprising rubber and the material obtained by mixing a polyalkylene polyamine and a naphthol at temperatures not substantially higher than the melting point of the naphthol.

13. Vulcanized rubber derived from rubber containing the material obtained by mixing a polyalkylene polyamine and a naphthol at temperatures not substantially higher than the melting point of the naphthol.

14. Vulcanized rubber derived from rubber containing the material obtained by mixing a polyalkylene polyamine and a naphthol, which material is substantially soluble in an excess of hot 10% sodium hydroxide.

15. Vulcanized rubber derived from rubber containing the material obtained by mixing a polyethylene polyamine having a boiling point above 130° C. and beta naphthol.

16. Vulcanized rubber derived from rubber containing the material obtained by mixing a material comprising diethylene triamine and beta naphthol.

17. As a retarder of deterioration for rubber, the material obtained by mixing a polyalkylene polyamine and a naphthol at temperatures not substantially higher than the melting point of the naphthol.

18. As a retarder of deterioration for rubber, the material obtained by mixing polyethylene polyamine and a monohydroxy naphthalene, which product is substantially soluble in an excess of hot aqueous 10% sodium hydroxide.

19. As a retarder of deterioration for rubber, the material obtained by mixing polyethylene polyamine and beta naphthol, which product is substantially soluble in an excess of hot aqueous 10% sodium hydroxide.

20. The process of retarding the deterioration and surface cracking of rubber which comprises treating rubber with the material obtained by mixing triethyltrimethylene triamine and a monohydroxy naphthalene.

21. The process of retarding the deterioration of rubber which comprises treating rubber in the form of a vulcanizable rubber stock with the material obtained by mixing triethyltrimethylene triamine and a monohydroxy naphthalene, and then vulcanizing the stock.

22. The process of retarding the deterioration and surface cracking of rubber which comprises treating a vulcanizable combination containing rubber, a vulcanizing agent, and a vulcanization accelerator with the material obtained by mixing triethyltrimethylene triamine and a naphthol.

23. Vulcanized rubber derived from rubber containing the material obtained by mixing triethyltrimethylene triamine and a monohydroxy naphthalene.

24. As a retarder of deterioration of rubber, the material obtained by mixing triethyltrimethylene triamine and a naphthol.

25. As a retarder of deterioration of rubber, the material obtained by mixing triethyltrimethylene triamine and beta naphthol.

26. The process of retarding the deterioration of rubber which comprises treating rubber with the material obtained by mixing a methylated polyalkylene polyamine and a naphthol.

27. The process of retarding the deterioration of rubber which comprises treating rubber with the material obtained by mixing a methylated polyethylene polyamine and beta naphthol.

28. As a retarder of deterioration of rubber the material obtained by mixing a methylated polyethylene polyamine and a naphthol.

29. As a retarder of deterioration of rubber the material obtained by mixing a methylated polyethylene polyamine and beta naphthol.

Signed at New York, county and State of New York, this 17 day of January, 1929.

SIDNEY M. CADWELL.

Signed at New York, county and State of New York, this 17 day of January, 1929.

SHERMAN I. STRICKHOUSER.